Patented June 29, 1937

2,085,047

UNITED STATES PATENT OFFICE 2,085,047

POROUS AND INSULATING MATERIALS

George Schneider, Montclair, N. J., assignor to Celanese Corporation of America, a corporation of Delaware No Drawing. Application February 24, 1934, Serial No. 712,750

13 Claims. (Cl. 18—48)

This invention relates to the production of porous materials and more particularly to the production of porous materials comprising derivatives of cellulose.

An object of the invention is the economic and expeditious production of porous materials from derivatives of cellulose that are heat and electric insulators, sound absorbing and of low specific gravity and that may be molded or shaped for wall insulation, refrigerator construction, pipe insulation, electric appliances, life buoys and many other uses. Other objects of the invention will appear from the following detailed description.

By this invention light weight porous materials having a derivative of cellulose base are formed. These materials are excellent insulating materials that are not affected by water and humid atmosphere. The materials are of advantage in use as insulating materials that are placed in relatively inaccessible damp places, such as in household refrigerating cabinets, as the materials besides being efficient insulators are, unlike natural organic fibrous products, resistant to fungoid growth, thereby their use makes a more sanitary refrigerating cabinet.

The products made according to this invention may be sponge-like or rigid. The rigid material will retain its strength whether wet or dry and is not susceptible to great expansion and contraction on being placed in water and then dried. The rigid material has sufficient strength to maintain its own weight and may be used in sheet or slab form as a wall board. In this use it has an advantage over former types of wall board in that one sheet may be joined to another at the abutting edges with a cellulose derivative lacquer and filler making a joint difficult to detect.

The articles, slabs or sheets of the material may be made waterproof and water repellent in which form it may be used, due to its low specific gravity, as life belt material and in similar uses. As an alternative the cellulose derivative therein may be saponified in part or entirely forming sponge-like materials for use as a substitute for natural sponge.

According to this invention I prepare light weight porous material having controlled varying properties such as, sizes of pores, strength, affinity or ability to take up or repel water or other liquids, pliability, color effects and many other desired properties. This material may be formed from derivatives of cellulose by mixing into a plastic mass or a solution of a derivative of cellulose a salt or other compound that is insoluble in the mass and that decomposes at least in part into a gas upon the application of heat insufficient to melt the cellulose derivative. The material may also contain effect and filling materials. The material may be made, by selecting the proper salt, the quantity and the fineness of particle size of the salt and its distribution in the mass, having any desired number and size of pores ranging from microscopic ducts to large air pockets distributed closely together or spaced widely apart. The sponginess or rigidness of the material may be controlled by plasticizers for the cellulose derivative and filling material or by the degree of saponification of the cellulose derivative.

The cellulose derivative forming the base material of the porous material may be cellulose nitrate preferably of low nitrogen content, organic esters and ethers of cellulose or mixed esters and ethers of cellulose. The materials most suitable for the purpose of this invention however are the organic derivatives of cellulose such as the organic esters and the ethers of cellulose. Examples of organic esters of cellulose are cellulose acetate, cellulose formate, cellulose propionate and cellulose butyrate, while examples of organic ethers of cellulose are ethyl cellulose, methyl cellulose and benzyl cellulose. Mixtures of one or more of the above substances may be employed. The organic esters of cellulose of any degree of esterification may be employed provided the proper reagent is employed to act as the solvent for the material. Thus cellulose acetate may be used having an acetyl value anywhere between 40 and 60% (determined as acetic acid).

A low boiling solvent may be employed to form the plastic mass or solution of the derivative of cellulose material. The selection of the solvent will depend largely upon the type of the derivative of cellulose and the insolubility and inertness of the gas producing salt therein both factors being within the knowledge of one skilled in the art. Examples of such solvents are chloroform, acetic acid, acetone, methyl acetate, alcohol, benzene, methyl ethyl ketone and ethylene dichloride, alone or in admixture with each other. To such a solution or plastic mass may be added higher boiling solvents and/or plasticizers that are insoluble in water. Examples of such solvents and plasticizers are camphor, tricresyl-phosphate, dimethyl phthalate, monoethyl-paratoluene sulfonamide, monomethyl xylene-sulfonamide, dibutyl tartrate, phthalic acid di ester of hypothetical methylene glycol monomethyl ether, dibutyl phthalate, and diethyl phthalate.

To the plastic mass or solution of the derivative of cellulose, with or without the presence of plasticizers, there may be added, effect and filling materials such as pigments, dyes and organic natural or synthetic bodies. Thus soluble dyes or insoluble pigments may be added to impart color thereto that may be incorporated in the material to give the effect of definite solid color, patterns or marble. Filling materials may be added for example cork, sawdust, wood shavings, clay and fibres such as cotton, wool, flax and asbestos. Mixtures of the effect and filling materials may be employed to a great advantage. Inorganic salts other than the gas forming salt may be added to the material to increase its resistance to heat and also to make the material fireproof. Examples of such salts are the borates, bromates and phosphates of alkali and other metal.

The solution of the derivative of cellulose and solvent may be formed of any desired concentration. Thus a 4% solution of cellulose acetate in acetone may be employed, a working consistency being formed by the addition of filling material. Such a low concentration is found to be of great advantage when using sawdust or ground cork as a filling material. Further the solution may be more concentrated, say a 25% solution of cellulose acetate in acetone. The viscosity of the solution, because of concentration of the cellulose derivative or because of the addition of plasticizers and filling materials, may be so great that it is necessary to work it in a plastic kneading device or it may be so limped as to be readily worked by any stirring device.

To the solution or plastic mass containing the derivative of cellulose is added a salt that is readily decomposed to a gas (or a gas forming constituent) upon application of heat. Examples of such salts are sodium or potassium carbonate, ammonium carbonate, sodium or potassium bicarbonate and ammonium bicarbonate, ammonium benzoate, ammonium cyanide, ammonium nitrite, ammonium sulphite, barium nitrite, bismuth subcarbonate, calcium oxalate, manganese oxalate, sodium formate. The salts may be mixed into the mass in a finely ground state but it is preferable that they be in particles about $\frac{1}{16}$ inch in diameter. The size of the particles in part controls the size of pockets and pores of the finished material. Thus if particles of ammonium carbonate of larger than ¼ inch diameter are employed large pockets are formed in the material while if it is employed in finely ground sizes there are no pockets formed but a plurality of almost microscopic ducts are formed. The preferred size of salt employed to form insulating material in slab form is about $\frac{1}{16}$ inch or less.

The solution may be flowed, molded or pressed into slab form depending upon the use to be made of the finished product. In the preferred form of most general application for making insulating material, a solution of 25% cellulose acetate in acetone containing 3 to 6 times the weight of cellulose acetate, of crushed (less than $\frac{1}{16}$") ammonium carbonate is pressed into slabs of about one inch thickness. This slab is allowed to stand in the air or at room temperature until the acetone has evaporated down to 8 to 20% of the cellulose acetate. The slab is then subjected to a temperature of about 100° C. until free of the odor of ammonia. The disassociation of the salt causes small pores to be formed to allow for the escape of the gas also the small pockets originally filled with the salt are vacated leaving a highly porous, low density, rigid slab. The density is about .0875 gram per c. c. This material is self supporting and unaffected by water. It does however absorb water by capillary attraction due to the smallness of the pores.

This material may be so processed to not only be unaffected by water but also to be non-absorbing by sealing the entrance to the pores with a coating of cellulose acetate in acetone. The coating may be applied by brushing, spraying or other known methods of applying coatings and may be limited to one face or extend over the entire surface as an envelope which is preferable for insulating "boards" to be used in the construction of refrigerators. The application of the coating increases the heat insulation properties of the material.

Novel materials may be formed by varying the concentration of the air spaces in the material. Thus the solution of cellulose derivative may be pressed onto a bed of the gas forming salt and a layer of the salt pressed into the top surface of the slab. Such a slab is then processed as above it being found however that the slab is most porous at the faces with a fairly rigid strengthening member in the center.

It is advisable if a smooth uniform slab is desired to allow sufficient amount of the solvent to evaporate before applying the heat of disassociation. Blocks and slabs not in molds that are heated prior to being set swell and warp out of shape and form large air pockets rather than small pores and pockets. The large air pockets are formed by a rupture of the walls normally separating the minute pockets thus forming a relatively large bubble in the material.

The material may be molded in substantially enclosed molds for example in a cylinder. After formation the material especially when coated may be cut and shaped very similarly to wood. The coating material may be composed of the same solution as the base material of the slab or article or it may be of a different material such as asphalt.

The following examples are given as description and not as limitations:

Example I 104 parts by weight of crushed ammonium carbonate of $\frac{1}{16}$" mesh or less is mixed with 26 parts by weight of 25% cellulose acetate (acetyl value of 54) acetone solution. This mass is pressed into a block. The block is then allowed to stand 17 hours in the air and then put in an oven at 90°–100° C. until free of the odor of ammonia. By using this salt no washing of the block is necessary and no saponification takes place. A firm porous block of a density of .0875 gram per c. c. is formed.

Example II 130 parts by weight of crushed sodium bicarbonate of $\frac{1}{16}$" mesh or less is mixed with 26 parts by weight of 25% cellulose acetate acetone solution. This mass is dried in air and then subjected to elevated temperatures above 200° C. The material contains residual products of sodium carbonate formed by the disassociation of the sodium bicarbonate that may be washed from the porous material.

Example III

Example I is repeated except that 10 parts by weight of a high boiling plasticizer or non-solvent softening agent are also added to the plastic mixture. Such plasticizers and non-solvent softening agents may be tricresyl phosphate, dibutyl phthalate and similar compounds. The product is similar to that obtained by Example I except that it is more resilient, springy and flexible.

It is to be understood that the foregoing detailed description is given merely by way of illustration and that many variations may be made therein, without departing from the spirit of my invention.

Having described my invention, what I desire to secure by Letters Patent is:

1. Method of preparing porous material containing derivatives of cellulose, which comprises mixing the derivatives of cellulose with particles of a solid substance that decomposes with formation of a gas under the influence of heat alone, at a temperature below the fusion temperature of the derivative of cellulose and subjecting the mixture to a temperature sufficiently high to decompose the substance to form the gas without fusing the cellulose derivative.

2. Method of preparing porous material containing organic derivatives of cellulose, which comprises mixing a solution of the derivative with particles of a salt that decomposes with formation of a gas under the influence of heat alone at a temperature below the fusion temperature of the derivative of cellulose and subjecting the mixture to a temperature sufficiently high to decompose the salt to form the gas without fusing the organic derivative of cellulose.

3. Method of preparing porous material containing cellulose acetate, which comprises mixing a solution of the cellulose acetate with particles of a salt that decomposes with formation of a gas under the influence of heat alone at a temperature below the fusion temperature of cellulose acetate and subjecting the mixture to a temperature sufficiently high to decompose the salt to form the gas without fusing the cellulose acetate.

4. Method of preparing porous material containing organic derivatives of cellulose, which comprises mixing a solution of the derivative of cellulose in a low boiling solvent, with particles of a salt that decomposes with formation of a gas under the influence of heat alone at a temperature below the fusion temperature of the organic derivative of cellulose, shaping the mixture, at least partially drying the mixture at normal temperatures and subjecting the shaped mixture to a temperature sufficiently high to decompose the salt to form the gas without fusing the organic derivative of cellulose.

5. Method of preparing porous material containing cellulose acetate, which comprises mixing a solution of the cellulose acetate in a low boiling solvent, with particles of a salt that decomposes with formation of a gas under the influence of heat alone at a temperature below the fusion temperature of the cellulose acetate, shaping the mixture, at least partially drying the mixture at normal temperatures and subjecting the shaped mixture to a temperature sufficiently high to decompose the salt to form the gas without fusing the cellulose acetate.

6. Method of preparing porous material containing organic derivatives of cellulose, which comprises mixing a solution of the derivative of cellulose with particles of a salt that decomposes with formation of a gas under the influence of heat alone at a temperature below the fusion temperature of the organic derivative of cellulose, subjecting the mixture to a temperature sufficiently high to decompose the salt to form the gas without fusing the organic derivative of cellulose, and saponifying, a least in part, the resulting material.

7. Method of preparing porous material containing cellulose acetate, which comprises mixing a solution of the cellulose acetate with particles of a salt that decomposes with formation of a gas under the influence of heat alone at a temperature below the fusion temperature of the cellulose acetate, subjecting the mixture to a temperature sufficiently high to decompose the salt to form the gas without fusing the cellulose acetate, and saponifying, at least in part, the resulting material.

8. Method of preparing porous material containing organic derivatives of cellulose, which comprises mixing a solution of the organic derivative of cellulose with a natural fibre filling material and particles of a salt that decomposes with formation of a gas under the influence of heat alone at a temperature below the fusion temperature of the organic derivative of cellulose, subjecting the mixture to a temperature sufficiently high to decompose the salt to form the gas without fusing the organic derivative of cellulose, and saponifying, at least in part, the resulting material.

9. Method of preparing porous material containing cellulose acetate, which comprises mixing a solution of the cellulose acetate with a natural fibre filling material and particles of a salt that decomposes with formation of a gas under the influence of heat alone at a temperature below the fusion temperature of the cellulose acetate, subjecting the mixture to a temperature sufficiently high to decompose the salt to form the gas without fusing the cellulose acetate, and saponifying, at least in part, the resulting material.

10. Method of preparing porous material containing organic derivatives of cellulose, which comprises mixing a solution of an organic derivative of cellulose and a plasticizer with a filling material and particles of a salt that decomposes with formation of a gas under the influence of heat alone at a temperature below the fusion temperature of the organic derivative of cellulose, and subjecting the mixture to a temperature sufficiently high to decompose the salt to form the gas without fusing the organic derivative of cellulose.

11. Method of preparing porous material containing cellulose acetate, which comprises mixing a solution of cellulose acetate and a plasticizer with a filling material and particles of a salt that decomposes with formation of a gas under the influence of heat alone at a temperature below the fusion temperature of the cellulose acetate, and subjecting the mixture to a temperature sufficiently high to decompose the salt to form the gas without fusing the cellulose acetate.

12. Method of preparing porous material containing cellulose acetate, which comprises mixing particles of ammonium carbonate with cellulose acetate and subjecting the mixture to a temperature sufficiently high to decompose the ammonium carbonate without fusing the cellulose acetate.

13. Method of preparing porous material containing cellulose acetate, which comprises mixing particles of sodium bicarbonate with cellulose acetate and subjecting the mixture to a temperature sufficiently high to decompose the sodium bicarbonate without fusing the cellulose acetate.

GEORGE SCHNEIDER.